United States Patent
Shindo et al.

(10) Patent No.: US 9,316,476 B2
(45) Date of Patent: Apr. 19, 2016

(54) PROFILE MEASURING INSTRUMENT, ADJUSTING METHOD FOR PROFILE MEASURING INSTRUMENT, AND PROFILE MEASURING METHOD

(71) Applicant: MITUTOYO CORPORATION, Kawasaki-shi, Kanagawa (JP)

(72) Inventors: Hideki Shindo, Kure (JP); Yoshiyuki Omori, Kure (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 212 days.

(21) Appl. No.: 14/055,324

(22) Filed: Oct. 16, 2013

(65) Prior Publication Data

US 2014/0109419 A1     Apr. 24, 2014

(30) Foreign Application Priority Data

Oct. 18, 2012   (JP) ................. 2012-231225

(51) Int. Cl.
  *G01B 5/20*    (2006.01)
  *G01B 5/008*   (2006.01)

(52) U.S. Cl.
  CPC .............. *G01B 5/20* (2013.01); *G01B 5/008* (2013.01); *G01B 5/201* (2013.01)

(58) Field of Classification Search
  CPC .......... G01B 5/20; G01B 11/24; G01B 21/20; G01M 11/30
  USPC .......................................... 33/503
  See application file for complete search history.

(56) References Cited

U.S. PATENT DOCUMENTS

| | | | | |
|---|---|---|---|---|
| 4,251,922 A | * | 2/1981 | Perlotto | B23Q 17/2225 33/1 M |
| 4,953,306 A | * | 9/1990 | Weckenmann | G01B 21/04 33/1 M |
| 6,327,788 B1 | * | 12/2001 | Seddon et al. | 33/551 |
| 2009/0300930 A1 | * | 12/2009 | Ishikawa | 33/559 |
| 2011/0246115 A1 | * | 10/2011 | Hon et al. | 702/95 |
| 2014/0130363 A1 | * | 5/2014 | Hagino et al. | 33/503 |
| 2014/0157564 A1 | * | 6/2014 | Miyata | 29/407.01 |

FOREIGN PATENT DOCUMENTS

| | | |
|---|---|---|
| EP | 744678 A2 * | 11/1996 |
| JP | 2010-164532 | 7/2010 |
| JP | 2010-185804 | 8/2010 |
| JP | 2011-208994 | 10/2011 |
| WO | WO 2008119558 A1 * | 10/2008 |

\* cited by examiner

*Primary Examiner* — Christopher Fulton
(74) *Attorney, Agent, or Firm* — Rankin, Hill & Clark LLP (57) ABSTRACT

A profile measuring instrument usable to perform a rotary scanning measurement and a linear scanning measurement on a workpiece in the form of a revolution solid, includes: a turntable on which the workpiece is mounted, the turntable being rotatable around a predetermined rotation axis; a rotary scanning measurement unit being adapted to measure a displacement of a surface of the workpiece mounted on the turntable; a linear scanning measurement unit being adapted to measure a profile of the surface of the workpiece mounted on the turntable along a predetermined measurement axis; and an aligning mechanism being adapted to relatively move the linear scanning measurement unit and the turntable in a direction intersecting with the measurement axis. The linear scanning measurement unit and the turntable are adjusted to relative positions at which the measurement axis passes through the rotation axis.

3 Claims, 8 Drawing Sheets

PROFILE MEASURING INSTRUMENT, ADJUSTING METHOD FOR PROFILE MEASURING INSTRUMENT, AND PROFILE MEASURING METHOD

The entire disclosure of Japanese Patent Applications No. 2012-231225 filed Oct. 18, 2012 is expressly incorporated by reference herein.

BACKGROUND OF THE INVENTION

1. Field of the Invention

The present invention relates to a profile measuring instrument, an adjusting method for a profile measuring instrument and a profile measuring method. In particular, the present invention relates to a technique for continuously performing so-called roundness measurement and profile measurement.

2. Description of Related Art

Typically, a complicatedly designed product such as an aspheric lens is required to be of high precision and thus a surface profile thereof is necessarily measured with a high accuracy.

In order to measure such a product (i.e., a workpiece), a linear scanning measurement is typically performed using a linearly movable profile measuring instrument to measure a profile along a scanning axis (see Patent Literature 1: JP-A-2010-164532).

In order to measure a workpiece in the form of a revolution solid such as an aspheric lens, a rotary scanning measurement is typically performed using a profile measuring instrument or roundness measuring instrument provided with a turntable to measure a roundness of the workpiece around its center axis, i.e., a profile variation of a surface of the workpiece (see Patent Literature 2: JP-A-2010-185804 or Patent Literature 3: JP-A-2011-208994).

As described above, a workpiece in the form of a revolution solid such as an aspheric lens is subjected to both the rotary scanning measurement and the linear scanning measurement.

Typically, a roundness measuring instrument provided with a turntable is used for the rotary scanning measurement and a linearly movable profile measuring instrument is used for the linear scanning measurement.

In other words, one workpiece is necessarily measured using two different measuring instruments (i.e., the roundness measuring instrument and the profile measuring instrument) and thus the workpiece has to be positionally adjusted each time when being mounted on one of the measuring instruments.

For the rotary scanning measurement, it is necessary to adjust a deviation (eccentricity) and an inclination between a rotary axis of the turntable of the roundness measuring instrument and a center axis of the workpiece. Accordingly, prior to an actual rotary scanning measurement, a preliminary measurement has to be repeated to eliminate the eccentricity or the inclination (i.e., centering). Incidentally, the adjustment of eccentricity and the adjustment of inclination are often referred to as centering and leveling, respectively. However, the meaning of a term "centering" hereinbelow includes the centering and the leveling in the narrow sense.

Using the profile measuring instrument, the linear scanning measurement is frequently performed along a diameter of the workpiece. Accordingly, prior to an actual linear scanning measurement, it is necessary to align the scanning axis with the diameter of the workpiece (i.e., an axis passing through the center axis of the workpiece) to eliminate the inclination (i.e., aligning). Specifically, a preliminary measurement is typically repeated to eliminate the deviation between these axes or to eliminate the inclination. Incidentally, the adjustment for eliminating the deviation between the axes and the adjustment for eliminating the inclination are often referred to as aligning and leveling, respectively. However, the meaning of a term "aligning" hereinbelow includes the aligning and the leveling in the narrow sense.

Since one workpiece has to be sequentially set on the roundness measuring instrument and the profile measuring instrument to be measured as described above, the annoying preliminary measurement has to be repeated to adjust the position of the workpiece on not only the roundness measuring instrument but also the profile measuring instrument, resulting in hindrance to improvement in operating efficiency.

SUMMARY OF THE INVENTION

An object of the invention relates to a profile measuring instrument, an adjusting method for a profile measuring instrument and a profile measuring method that are capable of simplifying a positional adjustment of a workpiece and improving operating efficiency.

According to an aspect of the invention, a profile measuring instrument usable to perform a rotary scanning measurement and a linear scanning measurement on a workpiece in a form of a revolution solid, includes: turntable on which the workpiece is mounted, the turntable being rotatable around a predetermined rotation axis; a rotary scanning measurement unit being adapted to measure a displacement of a surface of the workpiece mounted on the turntable; a linear scanning measurement unit being adapted to measure a profile of the surface of the workpiece mounted on the turntable along a predetermined measurement axis; and an aligning mechanism being adapted to relatively move the linear scanning measurement unit and the turntable in a direction intersecting with the measurement axis, in which the linear scanning measurement unit and the turntable are adjusted to relative positions at which the measurement axis passes through the rotation axis.

In the above aspect, the rotary scanning measurement unit may be configured based on a measurement unit of a roundness measuring instrument. An example of the usable measurement unit is a unit including a probe that is brought into contact with an upper surface and an outer circumference of a workpiece rotated with the turntable or brought into contact with a spherical workpiece (e.g., a lens) at a radial position on a surface of the workpiece.

The linear scanning measurement unit may be configured based on a measurement unit of a uniaxially movable profile measuring instrument or contour measuring instrument. An example of the usable measurement unit is a unit including a probe that is located near the turntable and adapted to be moved across a surface of a workpiece mounted on the turntable while being in contact with the surface of the workpiece.

Each of the rotary scanning measurement unit and the linear scanning measurement unit may use a non-contact probe such as an optical probe in place of the contact probe as described above.

A turntable used in an existing roundness measuring instrument may be used as the turntable of the above aspect as long as the turntable includes an adjusting mechanism enabling the centering and the leveling.

Any movement mechanism may be used as the aligning mechanism of the above aspect as long as the movement mechanism is movable in the direction intersecting with the measurement axis of the linear scanning measurement unit. Specifically, a linear movement mechanism may be provided between a base and the turntable and/or a support structure for the linear scanning measurement unit may be provided with a linear movement mechanism movable in the same direction.

The method for positionally adjusting the linear scanning measurement unit and the turntable such that the measurement axis passes through the rotation axis is preferably exemplified by an adjusting method for a profile measuring instrument according to the invention (described later). However, any method may be used as long as the relative positions of the linear scanning measurement unit and the turntable can be appropriately adjusted. For instance, respective reference positions of the measurement axis and the rotation axis may be predetermined through measurement so that the linear scanning measurement unit and the turntable are positionally adjusted with reference to these reference positions during an assembly process.

Although it is only necessary to positionally adjust the linear scanning measurement unit and the turntable once at the time of manufacturing or installation, the linear scanning measurement unit and the turntable may also be positionally adjusted at a periodic inspection or the like to keep a high accuracy.

According to the above aspect, prior to measurement on the workpiece, a preliminary measurement is performed using a calibration workpiece to adjust the relative positions of the linear scanning measurement unit and the turntable.

For measurement of the workpiece, first of all, the workpiece is mounted on the turntable and subjected to centering. After the centering, the workpiece is subjected to the rotary scanning measurement and the linear scanning measurement. Measurement data is obtained after each measurement. In order to measure another workpiece, the workpiece may be sequentially subjected to the rotary scanning measurement and the linear scanning measurement after being mounted on the turntable and subjected to centering. The rotary scanning measurement and the linear scanning measurement may be performed in the opposite order.

As described above, according to the above aspect, it is possible to omit aligning, which is typically performed prior to the linear scanning measurement. Specifically, the profile measuring instrument according to the above aspect includes both the rotary scanning measurement unit and the linear scanning measurement unit, which are positionally fixed, and thus one workpiece can be sequentially subjected to the rotary scanning measurement and the linear scanning measurement without being removed from the turntable, so that as long as the relative positions of the rotary scanning measurement unit and the linear scanning measurement unit are adjusted in advance, the same effect as that of aligning can be obtained and thus it is not necessary to perform aligning before each measurement.

As described above, according to the above aspect, the workpiece can be sequentially subjected to the rotary scanning measurement and the linear scanning measurement, so that the adjustments typically required before measurement of the workpiece can be omitted as long as the centering of the workpiece relative to the turntable is performed. In other words, according to the above aspect, an aligning operation, which is typically required for each time the workpiece is measured, can be omitted, resulting in simplification of the positional adjustment of the workpiece and thus in improvement in operating efficiency.

Further, in addition to improving the operating efficiency as described above, the profile measuring instrument according to the above aspect provides an excellent effect in a measurement data processing.

Specifically, once one workpiece is mounted on the turntable, the workpiece is sequentially subjected to the rotary scanning measurement and the linear scanning measurement without being removed from the turntable, so that a coordinate system of the rotary scanning measurement unit can be easily associated with a coordinate system of the linear scanning measurement unit and thus it is easily possible, for instance, to synthesize measurement data on the workpiece obtained through the rotary scanning measurement with measurement data obtained through the linear scanning measurement to provide three-dimensional data.

Further, during the linear scanning measurement, which is performed by moving the probe along the diameter of the workpiece, the workpiece can be turned with the turntable, so that it is possible to obtain profiles of the surface of the workpiece (uniaxial second-dimensional data) taken along plural diametral directions. For instance, three-dimensional data on the workpiece may be obtained by performing the scanning measurement along the diameter of the workpiece while turning the workpiece little by little (by a slight angle each time) and by performing a data smoothing process or the like as needed.

According to another aspect of the invention, an adjusting method for a profile measuring instrument being usable to perform a rotary scanning measurement and a linear scanning measurement on a workpiece in a form of a revolution solid and including: a turntable on which the workpiece is mounted, the turntable being rotatable around a predetermined rotation axis; a rotary scanning measurement unit being adapted to measure a displacement of a surface of the workpiece mounted on the turntable; a linear scanning measurement unit being adapted to measure a profile of the surface of the workpiece mounted on the turntable along a predetermined measurement axis; and an aligning mechanism being adapted to relatively move the linear scanning measurement unit and the turntable in a direction intersecting with the measurement axis, the adjusting method allowing adjustment of the linear scanning measurement unit and the turntable to relative positions at which the measurement axis passes through the rotation axis, the adjusting method includes: mounting a calibration workpiece on the turntable; performing a centering process including: performing the rotary scanning measurement on the calibration workpiece mounted on the turntable using the rotary scanning measurement unit; and adjusting a position and a posture of the calibration workpiece relative to the turntable such that a center axis of the calibration workpiece is aligned with the rotation axis of the turntable; and performing an aligning process including: performing the linear scanning measurement on the calibration workpiece using the linear scanning measurement unit after the position of the calibration workpiece is adjusted; and adjusting the position of the calibration workpiece relative to the turntable using the aligning mechanism such that the measurement axis of the linear scanning measurement unit passes through the center axis of the calibration workpiece.

According to the above aspect, after the calibration workpiece is mounted on the turntable, the centering of the calibration workpiece relative to the turntable is performed (i.e., the centering process) and then the calibration workpiece and the linear scanning measurement unit are positionally adjusted (i.e., the aligning process). Since the calibration workpiece is positionally adjusted relative to the turntable through the centering, when the measurement axis of the linear scanning measurement unit is adjusted to pass through the center axis of the calibration workpiece, the measurement axis passes through the rotation axis of the turntable.

Incidentally, the calibration workpiece, which may be the same in type as the workpiece to be actually measured, is preferably in a shape whose center axis can be easily located (e.g., a shape having a cylindrical outer circumference). In consideration of the linear scanning measurement, it is preferred that the center axis can be easily located and thus a shape whose vertex exists on a center axis thereof (e.g., a cone) is preferable.

According to still another aspect of the invention, a profile measuring method for performing a rotary scanning measurement and a linear scanning measurement on a workpiece in a form of a revolution solid, implemented using a profile measuring instrument including: a turntable on which the workpiece is mounted, the turntable being rotatable around a predetermined rotation axis; a rotary scanning measurement unit being adapted to measure a displacement of a surface of the workpiece mounted on the turntable; a linear scanning measurement unit being adapted to measure a profile of the surface of the workpiece mounted on the turntable along a predetermined measurement axis; and an aligning mechanism being adapted to relatively move the linear scanning measurement unit and the turntable in a direction intersecting with the measurement axis, the profile measuring method includes: positionally adjusting the linear scanning measurement unit and the turntable to relative positions at which the measurement axis passes through the rotation axis in advance; mounting the workpiece on the turntable; performing a centering process including: performing the rotary scanning measurement on the workpiece mounted on the turntable using the rotary scanning measurement unit; and adjusting a position and a posture of the workpiece relative to the turntable such that a center axis of the workpiece is aligned with the rotation axis of the turntable; and performing the rotary scanning measurement and the linear scanning measurement on the workpiece using the rotary scanning measurement unit and the linear scanning measurement unit, respectively, after the position and the posture of the workpiece are adjusted.

According to the above aspect, it is possible to obtain the same effects as those of the profile measuring instrument as described above.

DESCRIPTION OF EXEMPLARY EMBODIMENT(S)

An exemplary embodiment of the invention will be described below with reference to the drawings.

Profile Measuring Instrument

Figure 1:
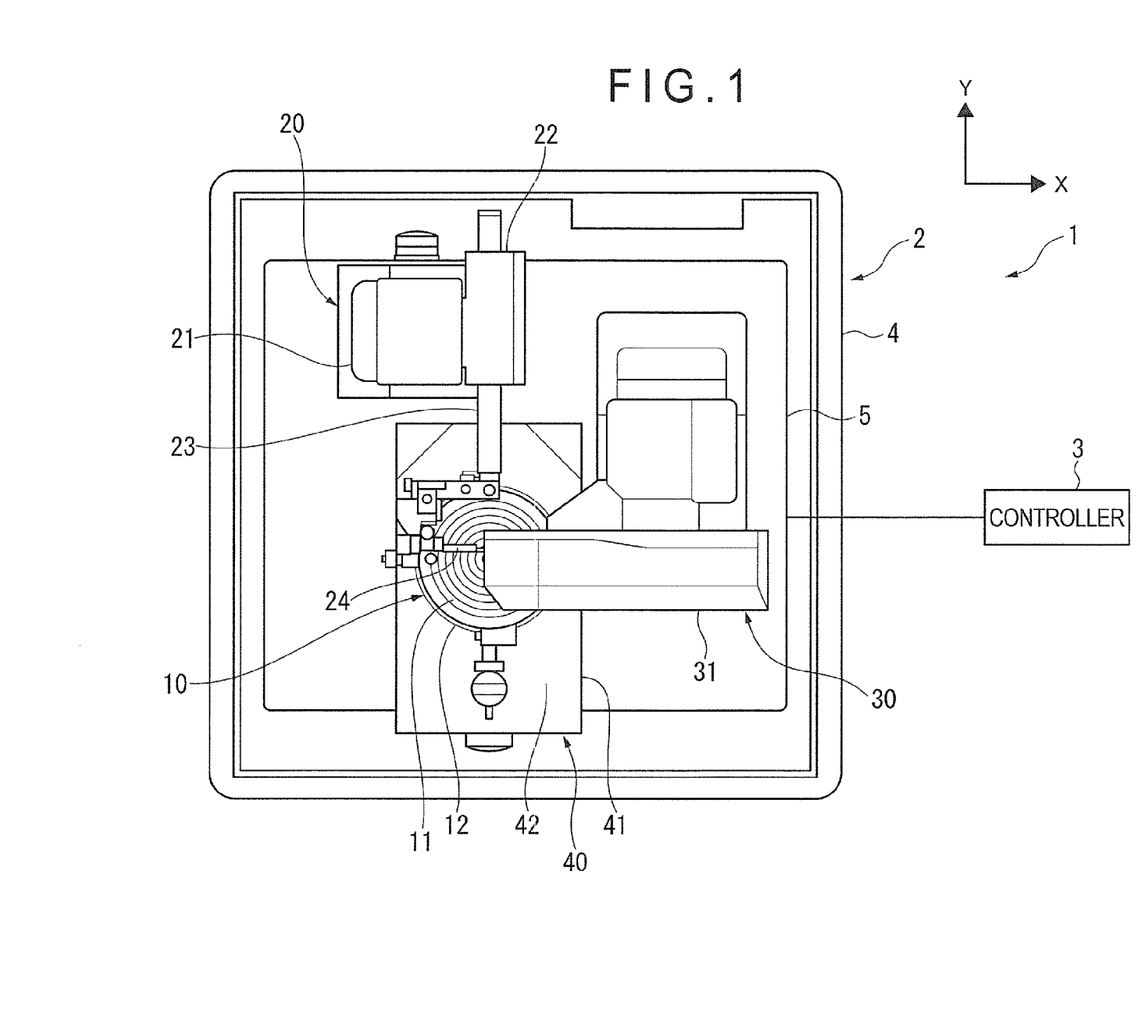
FIG. 1 is a plan view showing a profile measuring instrument according to an exemplary embodiment of the invention.
Figure 2:
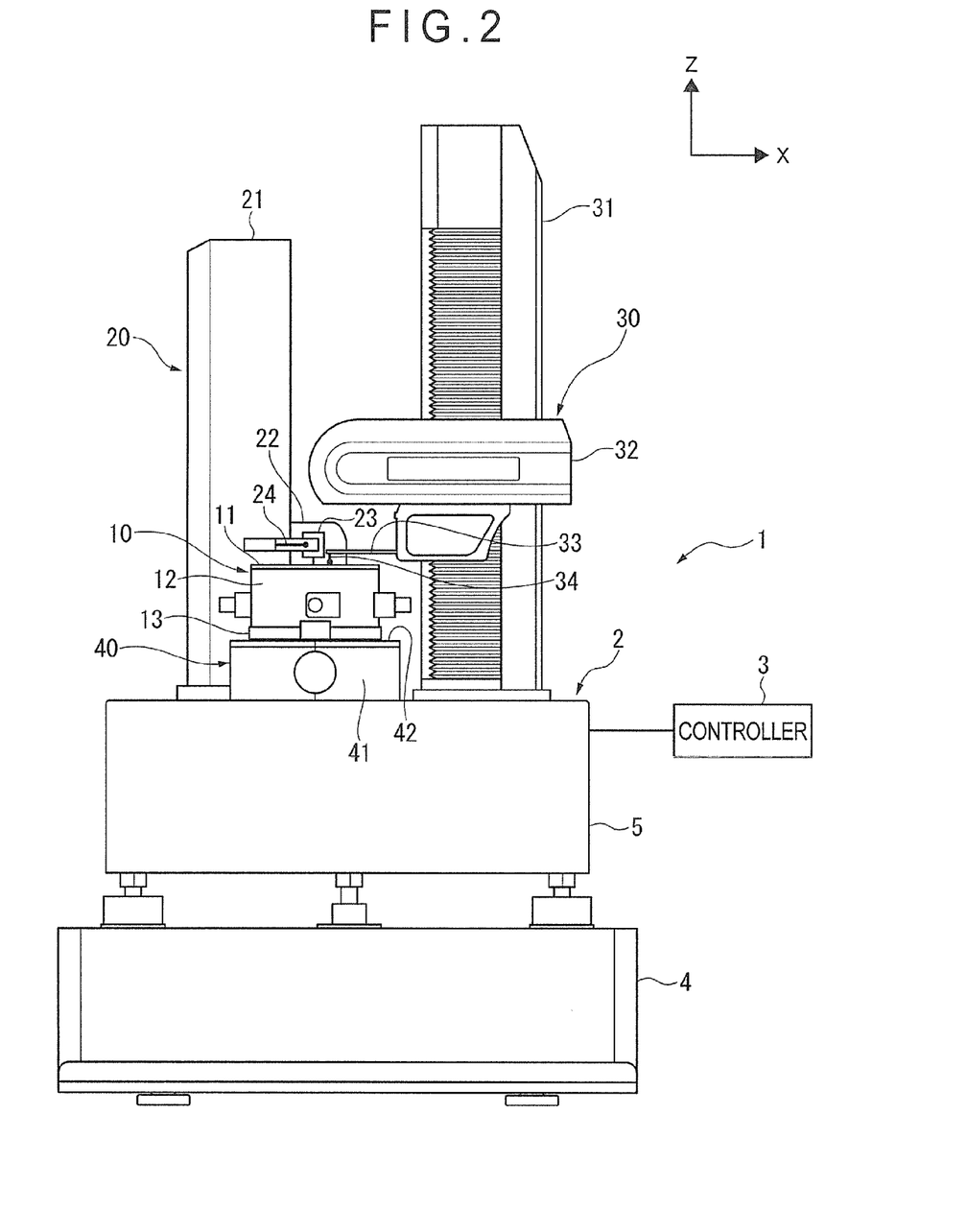
FIG. 2 is a front view of the profile measuring instrument according to the exemplary embodiment.
Figure 3:
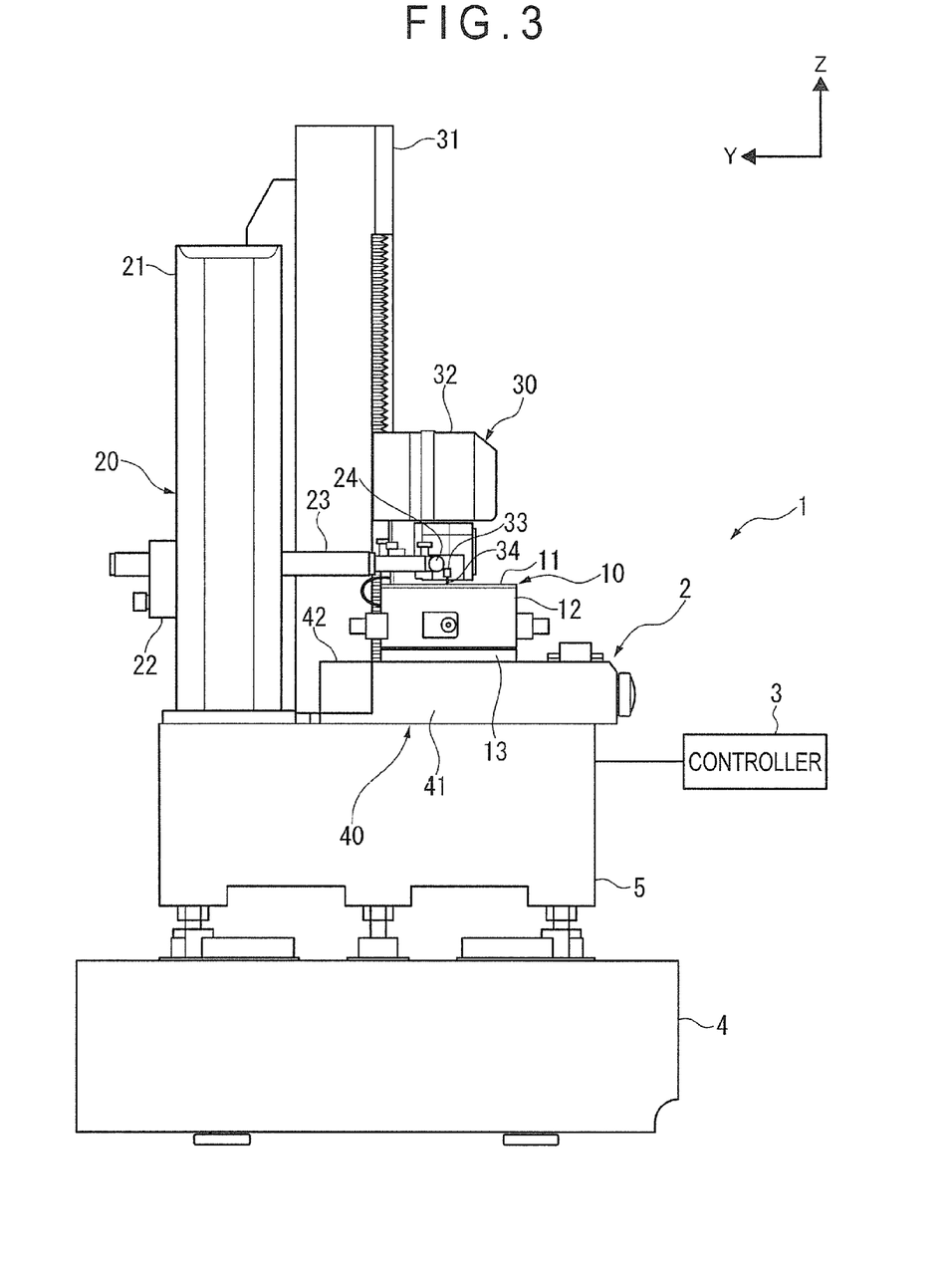
FIG. 3 is a side view of the profile measuring instrument according to the exemplary embodiment.

As shown in FIGS. 1, 2 and 3, a profile measuring instrument 1 includes a measuring instrument body 2 and a controller 3 that controls the measuring instrument body 2.

The measuring instrument body 2 includes a vibration isolation table 4, a base 5 supported on the vibration isolation table 4, a turntable 10, a rotary scanning measurement unit 20, a linear scanning measurement unit 30, and an aligning mechanism 40 located between the turntable 10 and the base 5. The turntable 10, the rotary scanning measurement unit 20 and the linear scanning measurement unit 30 are located on the base 5.

The controller 3 includes a drive controller and a processor (both not shown). The drive controller controls each section of the measuring instrument body 2 in accordance with an operation program implemented by the processor and measurement data sent from each section is processed by the processor.

The turntable 10 includes: a disc-shaped stage plate 11 having an upper surface on which a workpiece is mounted; and a body 12 on which the stage plate 11 is rotatably supported.

A base 13 is located under the body 12 and the turntable 10 is supported on the aligning mechanism 40 and the base 5 via the base 13.

A driving source such as an electric motor (not shown) is housed in the body 12 and is fixed to the base 13. The stage plate 11 can be rotated relative to the base 13 with a torque transmitted from the driving source.

The body 12 is provided with a rotation axis position adjusting mechanism and an inclination adjusting mechanism (both not shown). The rotation axis position adjusting mechanism serves to horizontally move the stage plate 11 in an X-axis direction and a Y-axis direction relative to the base 13 and the driving source. The inclination adjusting mechanism serves to adjust an inclination of a rotation axis of the stage plate 11 in the X-axis direction and the Y-axis direction. With the rotation axis position adjusting mechanism and the inclination adjusting mechanism enabling adjustment of a horizontal position of the stage plate 11 (a position defined by the X-axis and Y-axis) and an inclination of the stage plate 11 relative to a rotation axis of the driving source, it is possible to perform "centering", including the centering in the narrow sense (i.e., adjustment of a horizontal position) and the leveling in the narrow sense (i.e., adjustment of an inclination), of a workpiece mounted on the stage plate 11.

The rotary scanning measurement unit 20 is configured based on an existing roundness measuring instrument.

The rotary scanning measurement unit 20 is located on the upper surface of the base 5 at a portion adjacent to the turntable 10 in a Y-axis plus direction. A column 21 extending in a vertical direction (Z-axis direction) is located on the upper surface of the base 5. The column 21 is provided with a slider 22. The slider 22 is provided with an arm 23 extending in a Y-axis minus direction and having an end on which a probe 24 extending perpendicularly to the arm 23 is supported.

A rotational position around a longitudinal axis of the arm 23 is adjustable. By adjusting the rotational position of the arm 23, the probe 24 can be held in the vertical direction (Z-axis direction) or a horizontal direction (X-axis direction) or held inclined relative to the Z-axis and the X-axis. Incidentally, FIGS. 1 to 3 each show that the probe 24 is held in the horizontal direction (X-axis direction).

The arm 23 is movable relative to the slider 22 in a longitudinal direction (Y-axis direction) through a Y-axis driving mechanism (not shown) housed in the slider 22. The slider 22 is movable relative to the column 21 in the vertical direction (Z-axis direction) through a Z-axis driving mechanism (not shown). A reciprocating mechanism (not shown) is located between the arm 23 and the probe 24 to reciprocate the probe 24 relative to the arm 23 in a longitudinal direction of the probe 24 (i.e., in the Z-axis direction, the X-axis direction or any other direction intersecting with the Y-axis).

With the above relative movements, it is possible to adjust each of X-, Y- and Z-axial positions of the probe 24 of the rotary scanning measurement unit 20 relative to the turntable 10. By adjusting each axial position of the probe 24, it is possible to bring the probe 24 into contact with any position on a surface of a workpiece mounted on the turntable 10 in order to perform the rotary scanning measurement of the surface of the workpiece (see FIG. 4).

Figure 4:
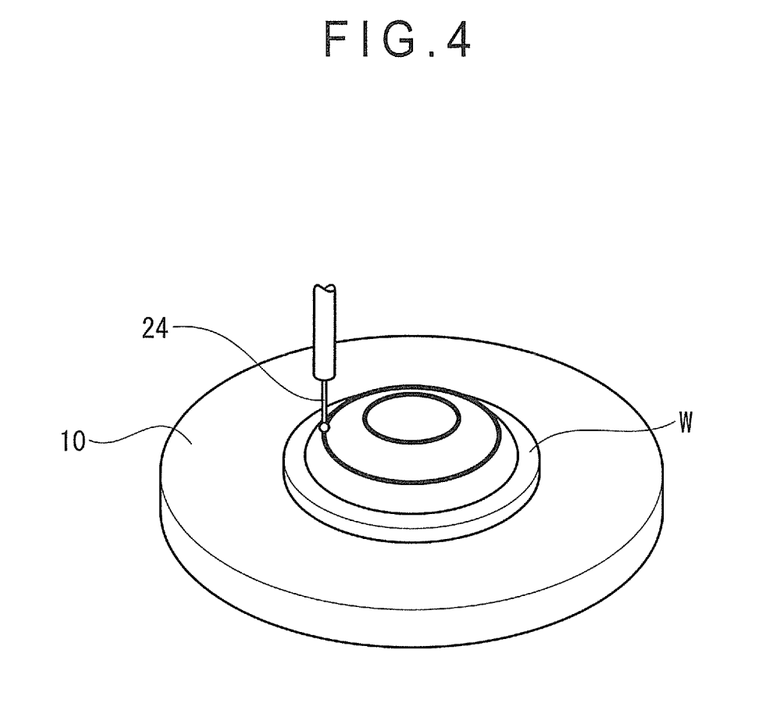
FIG. 4 is a perspective view showing an operation of a rotary scanning measurement according to the exemplary embodiment.

As shown in FIG. 4, a workpiece W is exemplified by an aspheric lens. When the turntable 10 is rotated while the probe 24 is in contact with a surface of the workpiece W at a position radially spaced from a center axis of the surface by a predetermined distance, the contact position of the probe 24 forms a circular locus on the surface of the workpiece W (i.e., the rotary scanning measurement is performed on the workpiece W).

The linear scanning measurement unit 30 is configured based on an existing contour measuring instrument.

The linear scanning measurement unit 30 is located on the upper surface of the base 5 at a portion adjacent to the turntable 10 in an X-axis plus direction. A column 31 extending in the vertical direction (Z-axis direction) is located on the upper surface of the base 5. The column 31 is provided with a slider 32. The slider 32 is provided with an arm 33 extending in the X-axis direction and having an end on which a probe 34 extending vertically downward (in the Z-axis minus direction) is supported.

The arm 33 can be moved in a longitudinal direction (X-axis direction) relative to the slider 32 through an X-axis driving mechanism (not shown) housed in the slider 32. The slider 32 is movable relative to column 31 in the vertical direction (Z-axis direction) through a Z-axis driving mechanism (not shown).

With these relative movements, it is possible to adjust each of X- and Z-axial positions of the probe 34 of the linear scanning measurement unit 30 relative to the turntable 10. By adjusting each axial position of the probe 34, while being in contact with a surface of a workpiece mounted on the turntable 10, the probe 34 can be moved along the X-axis direction (a measurement axis). During the movement of the probe 34 in the X-axis direction, a displacement of the probe 34 in the Z-axis direction occurs along the surface of the workpiece. The displacement of the probe 34 is detected for the linear scanning measurement of the surface of the workpiece (see FIG. 5).

Figure 5:
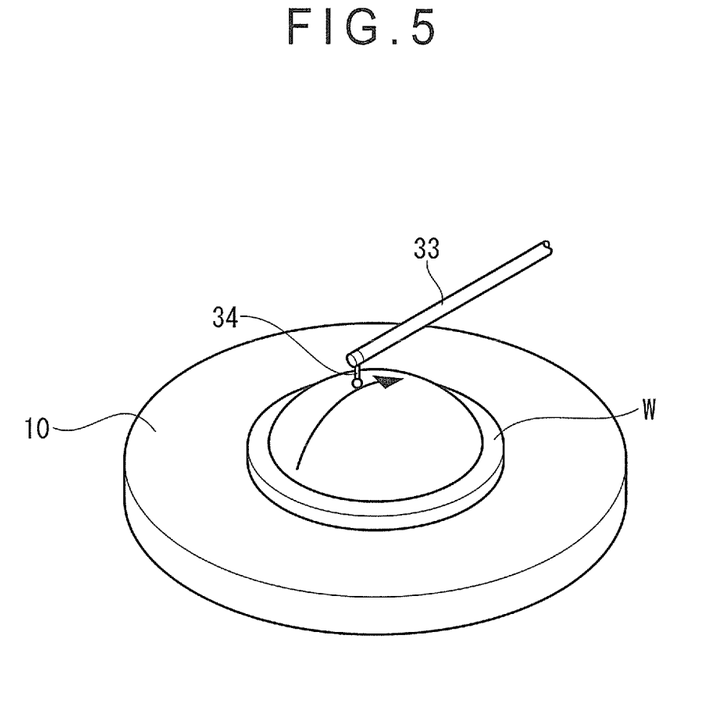
FIG. 5 is a perspective view showing an operation of a linear scanning measurement according to the exemplary embodiment.

As shown in FIG. 5, the workpiece W is exemplified by an aspheric lens. When the probe 34 is moved along a diameter of the workpiece W while being in contact with the surface of the workpiece W, a cross section (i.e., a profile) of the workpiece W can be obtained.

The aligning mechanism 40 includes a box-shaped body 41 and a table 42 located on an upper surface of the body 41. A driving mechanism (not shown) housed in the body 41 serves to move the table 42 in the Y-axis direction relative to the body 41.

The body 41 is located on the upper surface of the base 5 and the turntable 10 is supported on an upper surface of the table 42. Thus, when the table 42 is moved relative to the body 41, the turntable 10 is moved in the Y-axis direction relative to the base 5. In this manner, it is possible to adjust relative positions of the turntable 10 and the linear scanning measurement unit 30 in the Y-axis direction.

The linear scanning measurement unit 30, the measurement axis of which extends in the X-axis direction, is adapted to detect the Z-axial displacement. Thus, the linear scanning measurement unit 30 is positionally adjusted in the Y-axis direction for aligning of the linear scanning measurement unit 30 relative to the workpiece mounted on the turntable 10. Specifically, using the aligning mechanism 40 capable of the Y-axial movement, it is possible to achieve the aligning (the aligning in the narrow sense) of the linear scanning measurement unit 30.

Incidentally, the linear scanning measurement unit 30 further includes a mechanism for adjusting an inclination of the measurement axis extending in the X-axis direction (not shown), so that it is possible to adjust the inclination of the measurement axis relative to the turntable 10 (i.e., leveling). The meaning of the term "aligning" hereinbelow includes not only the aligning in the narrow sense, which is performed with the assistance of the aligning mechanism 40, but also the leveling, which is performed by the linear scanning measurement unit 30 itself.

Profile Measuring Method

Figure 6:
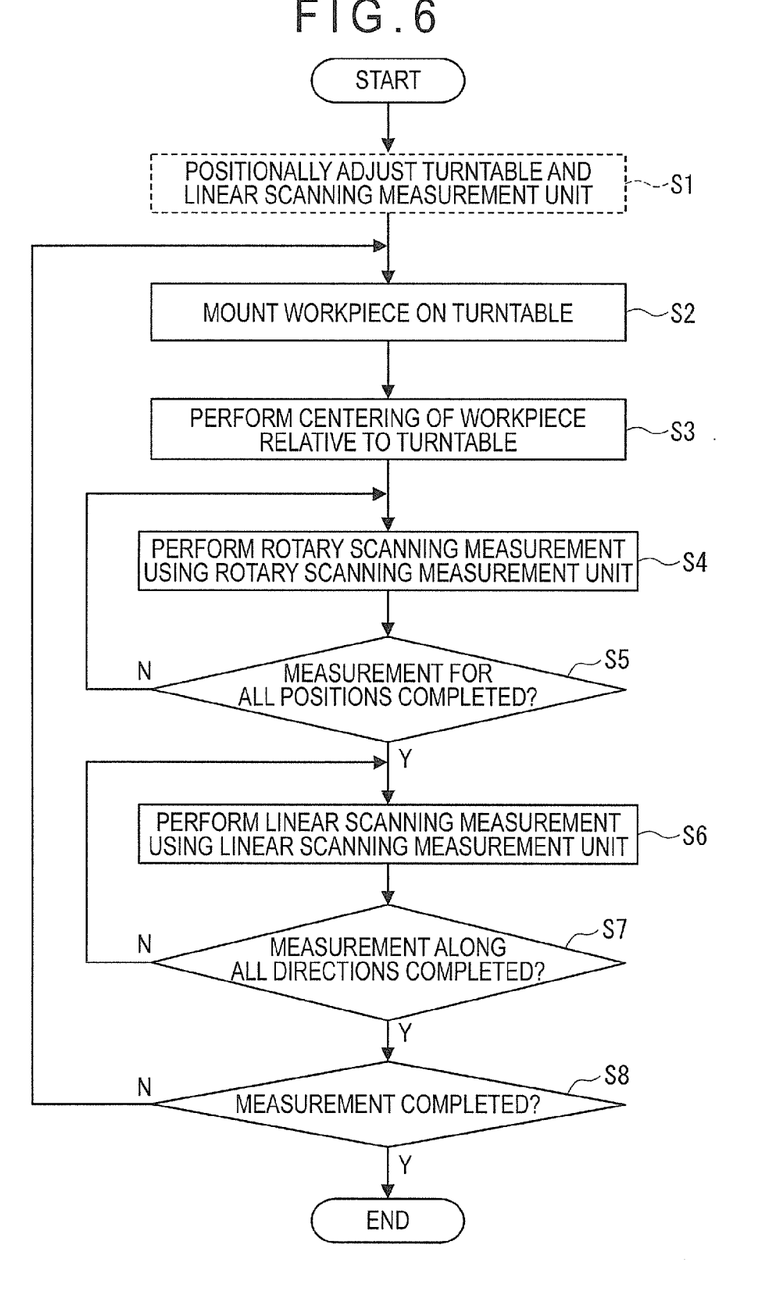
FIG. 6 is a flow chart showing a profile measuring method according to the exemplary embodiment.

In the profile measuring instrument 1 according to the exemplary embodiment, the measuring instrument body 2 is controlled by the controller 3 for the profile measurement of a workpiece. FIG. 6 shows a specific process of the profile measurement.

As shown in FIG. 6, for measuring a workpiece using the profile measuring instrument 1, the linear scanning measurement unit 30 and the turntable 10 are positionally adjusted in advance such that the linear scanning measurement unit 30 and the turntable 10 are set at the relative positions at which the measurement axis of the linear scanning measurement unit 30 passes through a rotation axis of the turntable 10 (a position adjusting step: step S1 in FIG. 6). A preferred process of the position adjusting step will be described later in detail with reference to FIG. 7.

After the position adjusting step, a workpiece is mounted on the turntable 10 of the profile measuring instrument 1 (a workpiece-mounting step; step S2 in FIG. 6), and then a rotary scanning measurement (a preliminary measurement) is performed on the workpiece mounted on the turntable 10 by the rotary scanning measurement unit 20 to adjust position and posture of the workpiece relative to the turntable 10 such that the center axis of the workpiece is aligned with the rotation axis of the turntable 10 (a centering step: step S3 in FIG. 6).

After the centering of the workpiece, the workpiece is subjected to the rotary scanning measurement performed by the rotary scanning measurement unit 20 and the linear scanning measurement performed by the linear scanning measurement unit 30. In the exemplary embodiment, the rotary scanning measurement is followed by the linear scanning measurement.

In a rotary scanning measurement step (step S4 in FIG. 6), the probe 24 of the rotary scanning measurement unit 20 is brought into contact with a surface of the workpiece and the turntable 10 is rotated while the probe 24 is in contact with the surface of the workpiece (see FIG. 4).

The rotary scanning measurement may be performed for plural times to obtain measurement results depending on different distances between the contact position of the probe 24 and the center axis of the workpiece (i.e., radii of the rotary scanning measurement). In this case, the above process is repeated until the rotary scanning measurement is performed at all the radial positions (step S5 in FIG. 6).

In a linear scanning measurement step (step S6 in FIG. 6), the probe 34 of the linear scanning measurement unit 30 is brought into contact with the surface of the workpiece and then moved along the measurement axis extending in a diametral direction of the workpiece W for the linear scanning measurement (see FIG. 5).

The workpiece W may be turned with the turntable 10 so that the linear scanning measurement is performed along plural diametral directions. In this case, the above process is repeated until the linear scanning measurement is performed along all the diametral directions (step S7 in FIG. 6).

When the rotary scanning measurement and the linear scanning measurement are both completed, step S2 and the subsequent steps are repeated in order to measure another workpiece, or, otherwise, the profile measurement is completed (step S8 in FIG. 6).

Adjusting Method for Profile Measuring Instrument

Figure 7:
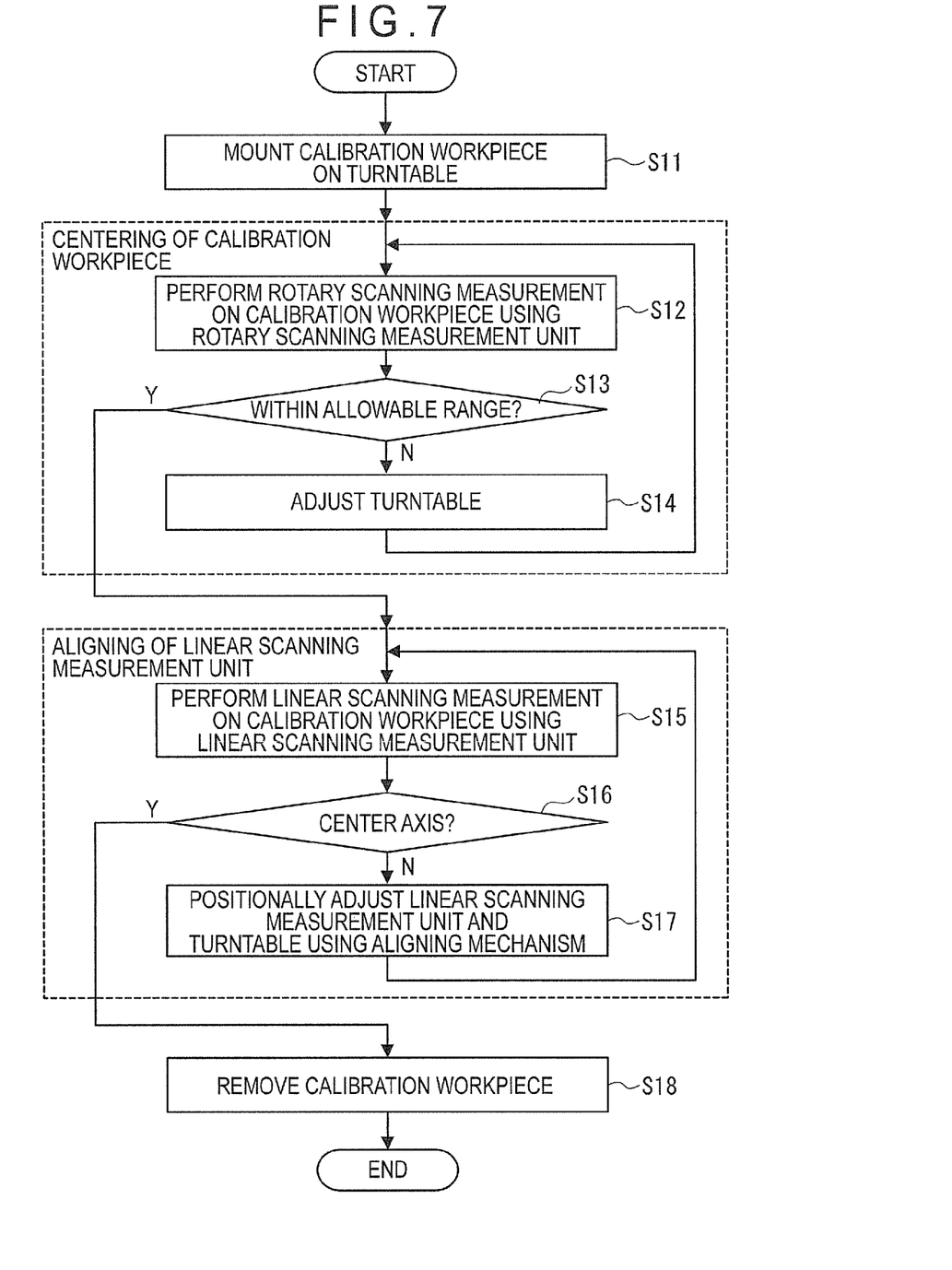
FIG. 7 is a flow chart showing a position adjusting method according to the exemplary embodiment.

In the profile measuring instrument 1 according to the exemplary embodiment, prior to measurement of the workpiece, the position adjusting step is performed to positionally adjust the linear scanning measurement unit 30 and the turntable 10 such that the measurement axis of the linear scanning measurement unit 30 passes through the rotation axis of the turntable 10 (step S1 in FIG. 6). FIG. 7 shows a preferred process of the position adjusting step.

As shown in FIG. 7, the preferred process of the position adjusting step includes: mounting a calibration workpiece on the turntable 10 (step S11); performing centering of the calibration workpiece (steps S12 to S14); performing aligning of the linear scanning measurement unit 30 (steps S15 to S17); and removing the calibration workpiece (step S18).

The centering of the calibration workpiece (steps S12 to S14) is performed as follows: the rotary scanning measurement is performed on the calibration workpiece by the rotary scanning measurement unit 20 and it is detected whether or not the measurement result has a variation, which results from a deviation between a center axis of the calibration workpiece and the rotation axis of the turntable 10 (step S12); it is judged whether or not the detected variation is within an allowable range (step S13); and when the detected variation is out of the allowable range, the rotation axis position adjusting mechanism and the inclination adjusting mechanism are activated to adjust the position and inclination of the center axis of the calibration workpiece relative to the rotation axis of the turntable 10 (step S14). Subsequently, the rotary scanning measurement is again performed to detect a deviation between these axes (step S12), and when it is judged that the detected variation is within the allowable range (step S13), the centering of the calibration workpiece is completed.

For the aligning of the linear scanning measurement unit 30 (steps S15 to S17), the linear scanning measurement is performed for plural times to obtain measurement results depending on measurement axes slightly shifted from each other, thereby locating the center axis of the calibration workpiece. Specifically, the aligning is achieved by repeating the following steps (1) to (3). (1) The linear scanning measurement is performed on the calibration workpiece by the linear scanning measurement unit 30 (step S15). (2) After each measurement, the last measurement data and the current measurement data are compared (e.g., in terms of the peak in the measurement data or the maximum value of the Z-coordinate) to judge whether or not the current measurement axis passes through the center axis of the calibration workpiece (step S16). (3) The measurement axis of the linear scanning measurement unit 30 (extending in the X-axis direction) is slightly shifted in the Y-axis direction using the aligning mechanism 40 (step S17). When it is found that the measurement axis passes through the center axis of the calibration workpiece in step S16, the process stops being repeated. At this time, since the measurement axis of the linear scanning measurement unit 30 passes through the center axis of the calibration workpiece (which has already been aligned with the rotation axis of the turntable 10 through the centering prior to the aligning), the aligning of the linear scanning measurement unit 30 is completed.

With the above process, the linear scanning measurement unit 30 is positionally adjusted relative to the turntable 10. Specifically, the center axis of the calibration workpiece is aligned with the rotation axis of the turntable 10 through the centering of the calibration workpiece (steps S12 to S14), and the measurement axis of the linear scanning measurement unit 30 is adjusted to pass through the center axis of the calibration workpiece, i.e., the rotation axis of the turntable 10, through the aligning of the linear scanning measurement unit 30 (steps S15 to S17).

Subsequently, the calibration workpiece is removed from the turntable 10 (step S18). The position adjusting step is in this manner completed to implement the required function.

Figure 8:
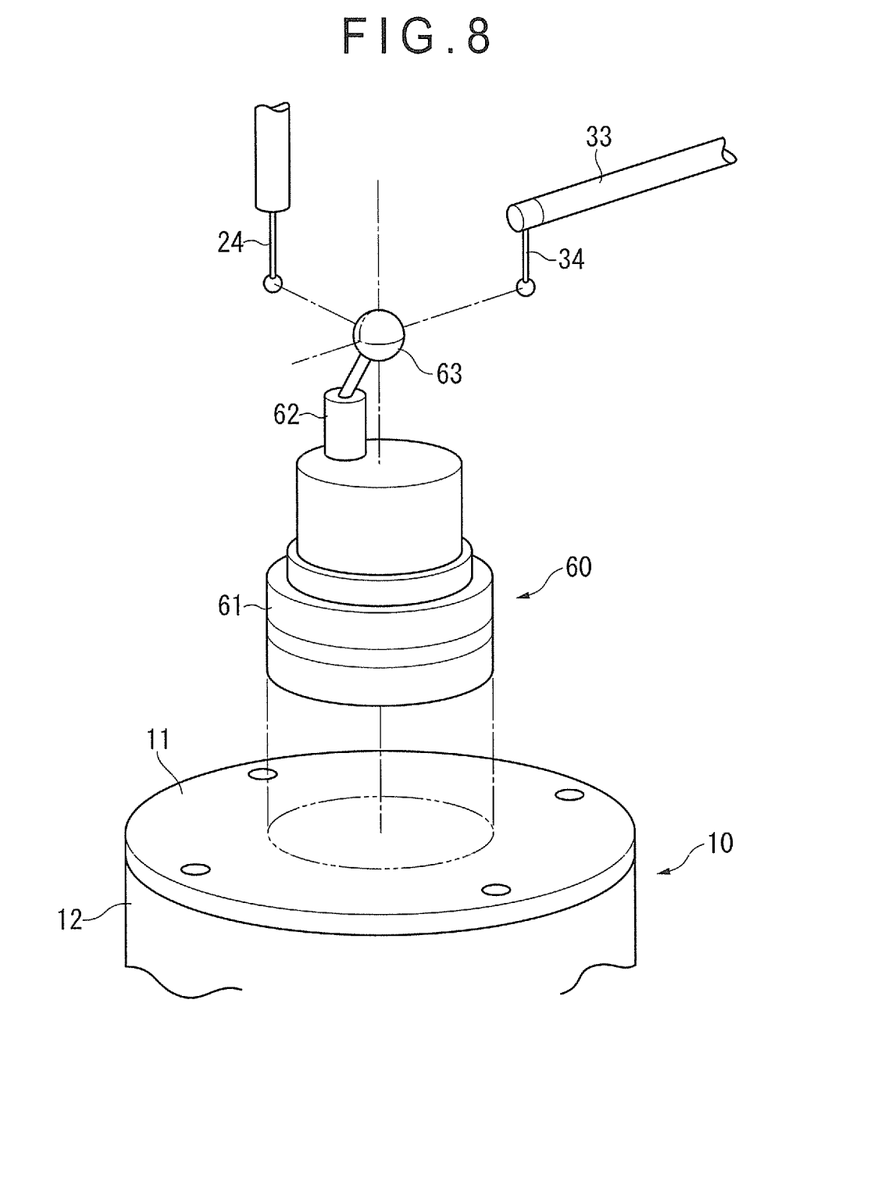
FIG. 8 is a perspective view showing an operation in the position adjusting method according to the exemplary embodiment.

Incidentally, the calibration workpiece used for the above position adjusting step may be provided by a dedicated calibration workpiece 60 as shown in FIG. 8.

As shown in FIG. 8, the calibration workpiece 60 includes: a cylindrical spindle 61 mountable on the stage plate 11 of the turntable 10; a support 62 that eccentrically stands upright on an upper surface of the spindle 61; and a spherical contact portion 63 that is fixed on an upper end of the support 62 with its center located on a center axis of the spindle 61.

The centering of the calibration workpiece 60 relative to the turntable 10 is performed as follows: the probe 24 of the rotary scanning measurement unit 20 is brought into contact with an equatorial position of the contact portion 63 and the rotary scanning measurement is performed; and the calibration workpiece 60 is positionally adjusted to eliminate runout.

Further, the aligning is performed using the calibration workpiece 60 as follows: the probe 34 of the linear scanning measurement unit 30 is brought into contact with the contact portion 63 and moved along an upper surface of the contact portion 63 from one side to the other side thereof to obtain profile data on the contact portion 63; and it is detected whether or not the obtained profile data has the highest peak. In this manner, by selecting the position of the linear scanning measurement unit 30 at which the profile data has the highest peak, it is possible to find the measurement axis that extends in the diametral direction of the calibration workpiece 60 and passes through the center axis of the calibration workpiece 60.

Effects of Exemplary Embodiment

According to the above exemplary embodiment, the workpiece can be sequentially subjected to the rotary scanning measurement and the linear scanning measurement, so that the adjustments typically required before measurement of the workpiece can be omitted except the centering of the workpiece relative to the turntable. In other words, an aligning operation, which is typically required for each time the workpiece is measured, can be omitted, resulting in simplification in the positional adjustment of the workpiece and thus in improvement in operating efficiency.

Further, in addition to the improvement in the operating efficiency as described above, the exemplary embodiment provides an excellent effect in a measurement data processing.

Specifically, once one workpiece is mounted on the turntable 10, the workpiece is sequentially subjected to the rotary scanning measurement and the linear scanning measurement without being removed from the turntable 10, so that a coordinate system of the rotary scanning measurement unit 20 can be easily associated with a coordinate system of the linear scanning measurement unit 30. It is thus easily possible to, for instance, synthesize measurement data on the workpiece obtained through the rotary scanning measurement with measurement data obtained through the linear scanning measurement to provide three-dimensional data.

Further, during the linear scanning measurement, which is performed by moving the probe along the diameter of the workpiece, the workpiece can be turned with the turntable 10, so that it is possible to obtain profiles (uniaxial second-dimensional data) of the surface of the workpiece taken along plural diametral directions. For instance, three-dimensional data on the workpiece may be obtained by performing the scanning measurement along the diameter of the workpiece while turning the workpiece little by little (by a slight angle each time) as described in relation to steps S6 and S7 in FIG. 6 and by performing a data smoothing process or the like as needed.

MODIFICATION(S)

Incidentally, the invention is not limited to the above exemplary embodiment but may include any modification or the like as long as the modification is compatible with the invention.

For instance, each of the turntable 10, the rotary scanning measurement unit 20 and the linear scanning measurement unit 30 may be configured based on a part of existing roundness measuring instrument, uniaxially movable profile measuring instrument or uniaxially movable contour measuring instrument. Each of the rotary scanning measurement unit and the linear scanning measurement unit may use a non-contact probe such as an optical probe in place of the contact probe.

The aligning mechanism 40 is exemplarily located between the base 5 and the turntable 10, and thus may be located between the linear scanning measurement unit 30 and the base 5 as long as the linear scanning measurement unit 30 includes a movement mechanism usable as the aligning mechanism 40.

What is claimed is:

1. A profile measuring instrument usable to perform a rotary scanning measurement and a linear scanning measurement on a workpiece in a form of a revolution solid, comprising:
   a turntable on which the workpiece is mounted, the turntable being rotatable around a predetermined rotation axis;
   a rotary scanning measurement unit being adapted to measure a displacement of a surface of the workpiece mounted on the turntable, the rotary scanning measurement unit comprising a first column, a first slider attached to the first column, a first arm attached to the first slider and a first probe supported by the first arm;
   a linear scanning measurement unit being adapted to measure a profile of the surface of the workpiece mounted on the turntable along a predetermined measurement axis, the linear scanning measurement unit comprising a second column, a second slider attached to the second column, a second arm attached to the second slider and a second probe supported by the second arm; and
   an aligning mechanism being adapted to relatively move the linear scanning measurement unit and the turntable in a direction intersecting with the measurement axis, wherein
   the linear scanning measurement unit and the turntable are adjusted to relative positions at which the measurement axis passes through the rotation axis.

2. An adjusting method for a profile measuring instrument being usable to perform a rotary scanning measurement and a linear scanning measurement on a workpiece in a form of a revolution solid and comprising:
   a turntable on which the workpiece is mounted, the turntable being rotatable around a predetermined rotation axis;
   a rotary scanning measurement unit being adapted to measure a displacement of a surface of the workpiece mounted on the turntable;
   a linear scanning measurement unit being adapted to measure a profile of the surface of the workpiece mounted on the turntable along a predetermined measurement axis; and
   an aligning mechanism being adapted to relatively move the linear scanning measurement unit and the turntable in a direction intersecting with the measurement axis, the adjusting method allowing adjustment of the linear scanning measurement unit and the turntable to relative positions at which the measurement axis passes through the rotation axis, the adjusting method comprising:
   mounting a calibration workpiece on the turntable;
   performing a centering process comprising:
   performing the rotary scanning measurement on the calibration workpiece mounted on the turntable using the rotary scanning measurement unit; and
   adjusting a position and a posture of the calibration workpiece relative to the turntable such that a center axis of the calibration workpiece is aligned with the rotation axis of the turntable; and
   performing an aligning process comprising:
   performing the linear scanning measurement on the calibration workpiece using the linear scanning measurement unit after the position of the calibration workpiece is adjusted; and
   adjusting the position of the calibration workpiece relative to the turntable using the aligning mechanism such that the measurement axis of the linear scanning measurement unit passes through the center axis of the calibration workpiece.

3. A profile measuring method for performing a rotary scanning measurement and a linear scanning measurement on a workpiece in a form of a revolution solid, implemented using a profile measuring instrument comprising:
   a turntable on which the workpiece is mounted, the turntable being rotatable around a predetermined rotation axis;
   a rotary scanning measurement unit being adapted to measure a displacement of a surface of the workpiece mounted on the turntable;
   a linear scanning measurement unit being adapted to measure a profile of the surface of the workpiece mounted on the turntable along a predetermined measurement axis; and
   an aligning mechanism being adapted to relatively move the linear scanning measurement unit and the turntable in a direction intersecting with the measurement axis, the profile measuring method comprising:
   positionally adjusting the linear scanning measurement unit and the turntable to relative positions at which the measurement axis passes through the rotation axis in advance;
   mounting the workpiece on the turntable;

performing a centering process comprising:
performing the rotary scanning measurement on the workpiece mounted on the turntable using the rotary scanning measurement unit; and
adjusting a position and a posture of the workpiece relative to the turntable such that a center axis of the workpiece is aligned with the rotation axis of the turntable; and
performing the rotary scanning measurement and the linear scanning measurement on the workpiece using the rotary scanning measurement unit and the linear scanning measurement unit, respectively, after the position and the posture of the workpiece are adjusted.

* * * * *